United States Patent
Mason (10) Patent No.: US 7,130,923 B2
(45) Date of Patent: Oct. 31, 2006

(54) METHOD AND APPARATUS FOR GUESSING CORRECT URLS USING TREE MATCHING

(75) Inventor: Kim D. Mason, Marsfield (AU)

(73) Assignee: Avaya Technology Corp., Basking Ridge, NJ (US)

( * ) Notice: Subject to any disclaimer, the term of this patent is extended or adjusted under 35 U.S.C. 154(b) by 859 days.

(21) Appl. No.: 10/188,222

(22) Filed: Jul. 1, 2002

(65) Prior Publication Data

US 2004/0003115 A1    Jan. 1, 2004

(51) Int. Cl.
G06F 15/16 (2006.01)
G06F 7/00 (2006.01)
G06F 17/00 (2006.01)
G06F 17/21 (2006.01)
G06F 17/28 (2006.01)
G01R 31/28 (2006.01)
G06F 15/173 (2006.01)
G06F 17/30 (2006.01)
G06F 15/00 (2006.01)
G06F 17/24 (2006.01)
G06F 11/00 (2006.01)

(52) U.S. Cl. .............. 709/245; 709/219; 709/225; 709/228; 707/6; 707/104.1; 707/205; 715/533; 714/737; 704/4

(58) Field of Classification Search ............. 709/203, 709/219, 225–229, 239, 245; 707/6, 104.1; 707/205; 715/533; 714/53, 737; 704/4, 704/10
See application file for complete search history.

(56) References Cited

U.S. PATENT DOCUMENTS

| | | | | |
|---|---|---|---|---|
| 5,751,961 A | * | 5/1998 | Smyk | 709/217 |
| 5,892,919 A | * | 4/1999 | Nielsen | 709/228 |
| 5,907,680 A | * | 5/1999 | Nielsen | 709/228 |
| 6,026,445 A | * | 2/2000 | Kephart et al. | 709/245 |
| 6,092,100 A | * | 7/2000 | Berstis et al. | 709/203 |
| 6,249,813 B1 | * | 6/2001 | Campion et al. | 709/222 |
| 6,526,450 B1 | * | 2/2003 | Zhang et al. | 709/245 |
| 6,560,634 B1 | * | 5/2003 | Broadhurst | 709/203 |
| 6,694,358 B1 | * | 2/2004 | Swildens et al. | 709/218 |
| 6,779,039 B1 | * | 8/2004 | Bommareddy et al. | 709/238 |
| 6,845,400 B1 | * | 1/2005 | Macpherson et al. | 709/245 |
| 6,862,625 B1 | * | 3/2005 | Busey et al. | 709/227 |
| 6,895,430 B1 | * | 5/2005 | Schneider | 709/217 |

* cited by examiner

*Primary Examiner*—Jason Cardone
*Assistant Examiner*—Melvin H. Pollack
(74) *Attorney, Agent, or Firm*—Sheridan Ross P.C.

(57) ABSTRACT

The present invention assists a user in locating an intended address even where an address entered by the user is incorrect. In particular, in accordance with an embodiment of the present invention, an address structure entered by a user containing an existing domain name is considered as a vine of interconnected elements. This vine is then compared to the tree structure of the correctly named domain. A possible match or matches within the domain for the address entered by the user are returned to the user. The possible match or matches may be assigned an accuracy score to assist the user in locating the desired address. The present invention is applicable to any system utilizing addresses that can be considered as a series of elements, such as universal resource locators.

25 Claims, 6 Drawing Sheets

METHOD AND APPARATUS FOR GUESSING CORRECT URLS USING TREE MATCHING

FIELD OF THE INVENTION

The present invention relates to providing assistance in locating an intended address or universal resource locator. In particular, the present invention relates to providing possible paths existing under a domain name in response to the receipt of a requested address having the domain name and a nonexistent path under that domain name.

BACKGROUND OF THE INVENTION

Communication networks, including computer networks, increasingly rely on sequences of characters as addresses that are used to define the location of information. For example, a user desiring to view a particular Internet web page typically must enter a universal resource locator (URL) comprising a domain name and elements specifying a path or subpath under that domain name. Similarly, a telecommunication system using addresses such as the session initiation protocol utilizes universal resource locators to identify particular communication devices or the intended recipients of communications. Under such systems, when a user attempts to contact a particular address, the user is required to enter the correct address exactly. Any character entered in error or omitted from a sequence comprising a universal resource locator generally results in the generation of an error signal.

A universal resource locator typically includes a number of elements. For example, all URLs specify a domain name consisting of a name chosen by the holder of the domain and a suffix indicating the top level domain under which the domain is established (e.g., .com or .org). In addition, paths, which may include paths and subpaths, that are identified by additional elements appended to the domain name may be formed under the domain. The elements specifying paths and subpaths can be arbitrarily assigned by the holder of the domain and can be extremely lengthy. Accordingly, accessing a particular address within a domain can be difficult.

One method of dealing with an erroneously entered address is to present a static error page to the user. For example, a user attempting to access a particular web page may be provided with a static error notification page if the user incorrectly guesses the URL of the desired page, or if the user incorrectly enters or omits a character of the URL for that page. The error page is static in that it provides no more than general information regarding the error. For example, the user may simply be informed that the requested page is currently unavailable, for example, due to technical difficulties at the target website or due to improper browser settings.

Certain web pages may provide suggestions regarding web addresses that are similar to a URL or web address entered by the user when the entered address cannot be located. However, the suggested addresses are limited to suggested domain names, exclusive of paths and subpaths. Accordingly, the suggested address function is available only where a user fails to correctly enter the domain name. No assistance is provided to the user in locating a specific address existing under a domain.

Other systems are available to assist a user in locating a particular page where the user successfully enters a domain name. In particular, according to such systems, a user who correctly enters a domain name followed by a single element that does not correspond to the address or path of a page under that domain is provided with a list of pages that are of possible interest to the user. These systems operate by performing a search of pages existing under the specified domain for the term comprising the element appended to the domain name by the user. Pages containing information about that term are provided as search results. Accordingly, such systems are useful where a domain name followed by a search term is entered by the user. However, such sites are incapable of directing the user to a particular page where, for example, multiple pages incorporate information corresponding to the search term. In addition, such systems do not perform a search with respect to subpath elements specified by a user, limiting the usefulness of such systems in directing a user to a particular page.

Still other systems for directing a user to an intended universal resource locator dynamically rewrite the address entered by the user. In particular, a set of rules for replacing entered search terms with new search terms are followed. Such systems are useful, for example, where the address of a web page has been moved. However, such systems do not function well in response to URLs containing misspelled elements or other typographical errors. In particular, such systems are useful only in connection with entered addresses that correspond exactly with a superceded address.

Approaches for correcting information entered by a user, including checking entered terms against a dictionary are available. Alternate terms may then be presented to the user, and the user may then select those alternate terms, if desired. For example, such functions are available in connection with certain Internet search engines. In particular, such systems attempt to correct errors in the terms included in a set of search terms. However, such systems are not applicable to errors occurring within strings of characters comprising URLs.

SUMMARY OF THE INVENTION

The present invention is directed to solving these and other problems and disadvantages of the prior art. According to the present invention, a correct or suggested address structure or universal resource locator is returned to a user in response to an entered address structure that contains a correct domain name but an incorrect path or subpath within the specified domain. As can be appreciated, an address structure may comprise any sequence of characters.

As used herein, the term "path" may include a path or a path and one or more subpaths within a domain identified by a domain name. In addition, the terms of an address denoting the domain and a particular path or subpath within a domain are referred to herein as "address elements". "Path elements" are those address elements that denote a particular path or subpath. Furthermore, a path element or series of elements, which may denote a path or a path and one or more subpaths, in combination with an address element denoting a domain name, comprise an address structure.

In accordance with an embodiment of the present invention, a server is provided with a software module for guessing or suggesting an intended path or subpath in response to a request for a non-existent address within an existing domain. In particular, the address structure entered by the user is considered as a vine having one or more path or subpath elements. In addition, the structure of the path elements and subpath elements within the domain is considered as a tree. Pattern matching techniques are then used to attempt to match the vine provided by the user to a path or subpath within the tree. Where multiple paths or subpaths may correspond to the user's intended address, each of those possible paths may be returned to the user. In accordance with an embodiment of the present invention, each of the paths are ranked according to the likelihood that each path is the one intended by the user.

In accordance with an embodiment of the present invention, the vine consisting of path and any subpath elements entered by a user is compared to the structure of the domain entered by the user. A structure of domain path elements within the tree structure of the domain having a structural similarity to the entered vine are returned as potential intended addresses. As used herein, a domain path element may denote a path or subpath within a domain.

In accordance with still another embodiment of the present invention, a matching function is performed by a software module resident on a server associated with the domain. The software module is provided with detailed information regarding the structure of the paths and subpaths included within the domain, and incorporates algorithms to perform a matching between elements of an entered string and elements found within the structure of the domain.

According to a further embodiment of the present invention, elements within an address entered by a user are checked for accuracy against a spell check dictionary. The spell check dictionary may comprise a conventional word processing dictionary for a language corresponding to the language used within the domain. According to another embodiment of the present invention, the spell check facility utilizes a dictionary comprising terms found within the content stored within the domain, or terms used as path and subpath elements within the domain.

These and other advantages and features of the invention will become more apparent from the following description of the invention taken together with the drawings.

DETAILED DESCRIPTION

Figure 1:
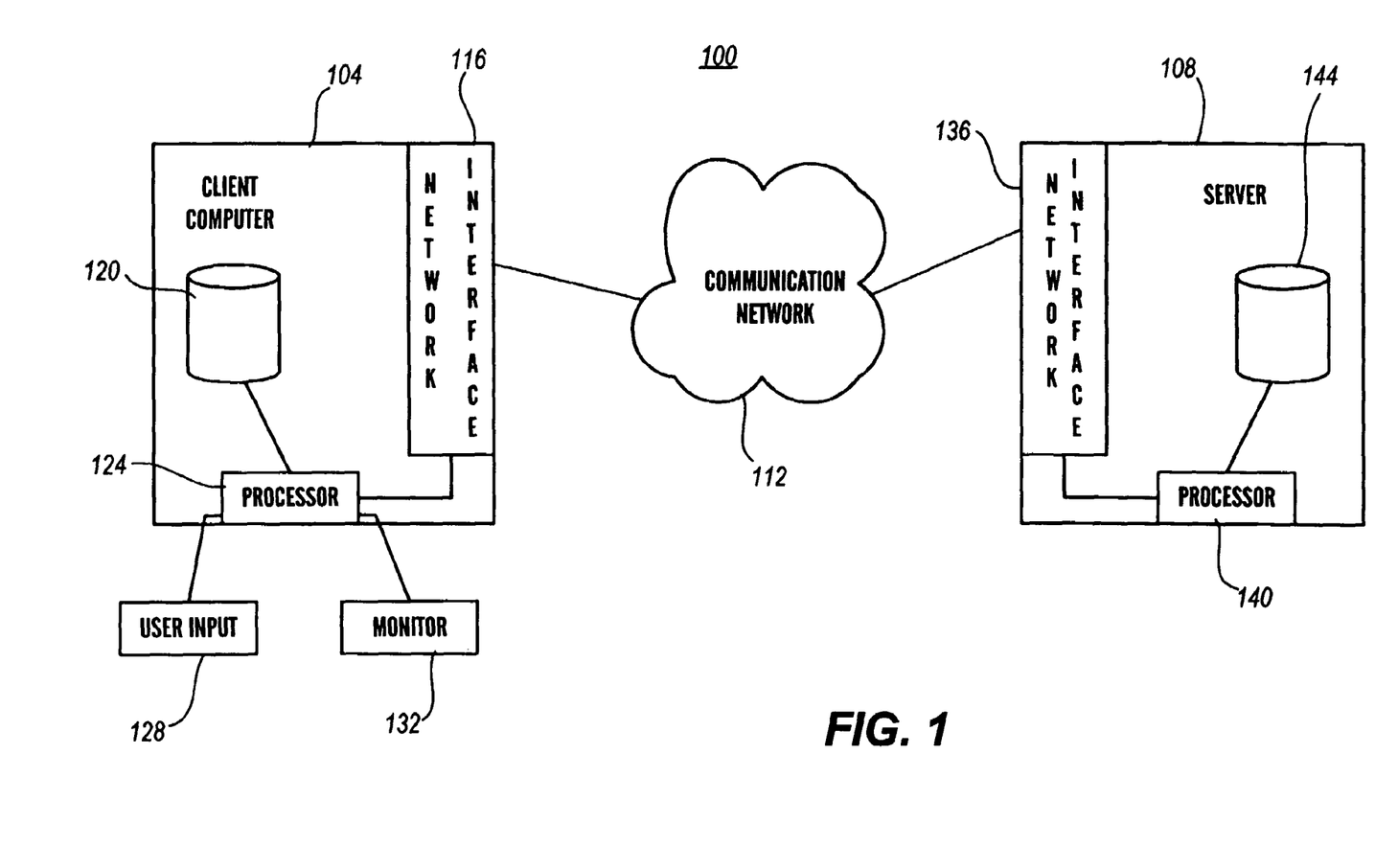
FIG. 1 is a block diagram depicting a communication arrangement in accordance with an embodiment of the present invention.

FIG. 1 is a block diagram depicting a communication arrangement 100 incorporating a system in accordance with an embodiment of the present invention. In general, the system 100 includes a client computer 104 interconnected to a server computer 108 by a communication network 112.

The client computer 104 generally includes a network interface 116, a data storage device 120, and a processor 124. A user input device 128, such as a keyboard or pointing device, may be interconnected to the client computer 104. A monitor 132 or other device for displaying information may also be interconnected to the client computer 104. In general, the network interface 116 serves to interconnect the client computer 104 to the communication network 112. Accordingly, the network interface may comprise a computer network interface, a modem or any other device capable of providing the functions and physical interconnections required to allow the client computer 104 to communicate over the network 112. The data storage device 120 provides storage for the operating system and software applications resident on the client computer 104. Examples of software applications that may be resident on the client computer include Internet browser applications and Internet telephony applications. In addition, the data storage 120 may include storage for various data files. The data storage device 120 may comprise one or more devices of various types. For example, the data storage device 120 may comprise a hard disk drive, floppy disk drive, solid state memory, optical memory, tape drive, or other storage device. The processor 124 may include a general purpose computer processor, such as a Pentium™ processor, or a dedicated or programmable controller. As can be appreciated by one of skill in the art, the client computer 104 is not limited to general purpose or personal computing type devices. For example, the client computer 104 may comprise a communication device, such as a telephone or video phone. In addition, the client computer 104 may comprise a hand-held device, such as a personal digital assistant.

The communication network 112 may comprise a packet data network and/or a switched circuit network. For example, the communication network 112 may comprise the public switched telephony network (PSTN), a local area network (LAN), a wide area network (WAN), the Internet, or a private intranet.

The server 108 generally includes a network interface 136 for interconnecting the server 108 to the communication network 112. In addition, the server may comprise a processor 140 and a data storage device 144. The processor 140 may be any general purpose, programmable processor capable of running an operating system and applications, including any application or module for implementing functions of the present invention. For example, the processor 140 may comprise a Pentium™ or Power PC™ processor. The data storage device 144 may comprise one or more devices of various types. For example, the data storage device 144 may comprise a hard disk drive, an optical drive, or solid state memory. The data storage device 144 may provide storage for the operating system and software applications resident on the server 108. Examples of software application that may be resident on the server 108 include web server applications and modules operating in a stand alone manner or as a plug-in to other applications to perform the tree matching and other functions of the present invention.

In operation, the client computer 104 may receive an address structure from a user entered through the user input 128. The address structure typically includes address elements specifying a domain name and one or more path elements. The processor 124 of the client computer 104, and in particular software running on the processor 124, receives the address structure. The application may then send out a request for a connection to a device, or for information located at the entered address through the network interface 116 to the communication network 112. As can be appreciated, the address may comprise a universal resource locator (URL). Furthermore, the address may comprise a domain name, for example, in connection with an Internet protocol type address. In addition, the address may comprise a path, and one or more subpaths.

In general, the domain name comprises a top level domain and a name chosen by the holder of the domain that corresponds to a numeric address identifying a particular server interconnected to the communication network 112. In a typical example of the use of a universal resource locator in connection with an Internet address, the numeric address for the requested server 108 is found by querying a domain name server or resolver using the entered domain name. Using this information, the client computer 104 may be interconnected to the server 108 across the communication network 112. That is, a virtual communication channel may be established between the client computer 104 and the server 108. Individual devices or pages of information associated with the domain and stored on or associate with the server 108 may then be accessed. In general, the individual devices or pages of information are identified by a path under the domain name that comprises a path element, or a path element and one or more subpath elements.

Figure 2:
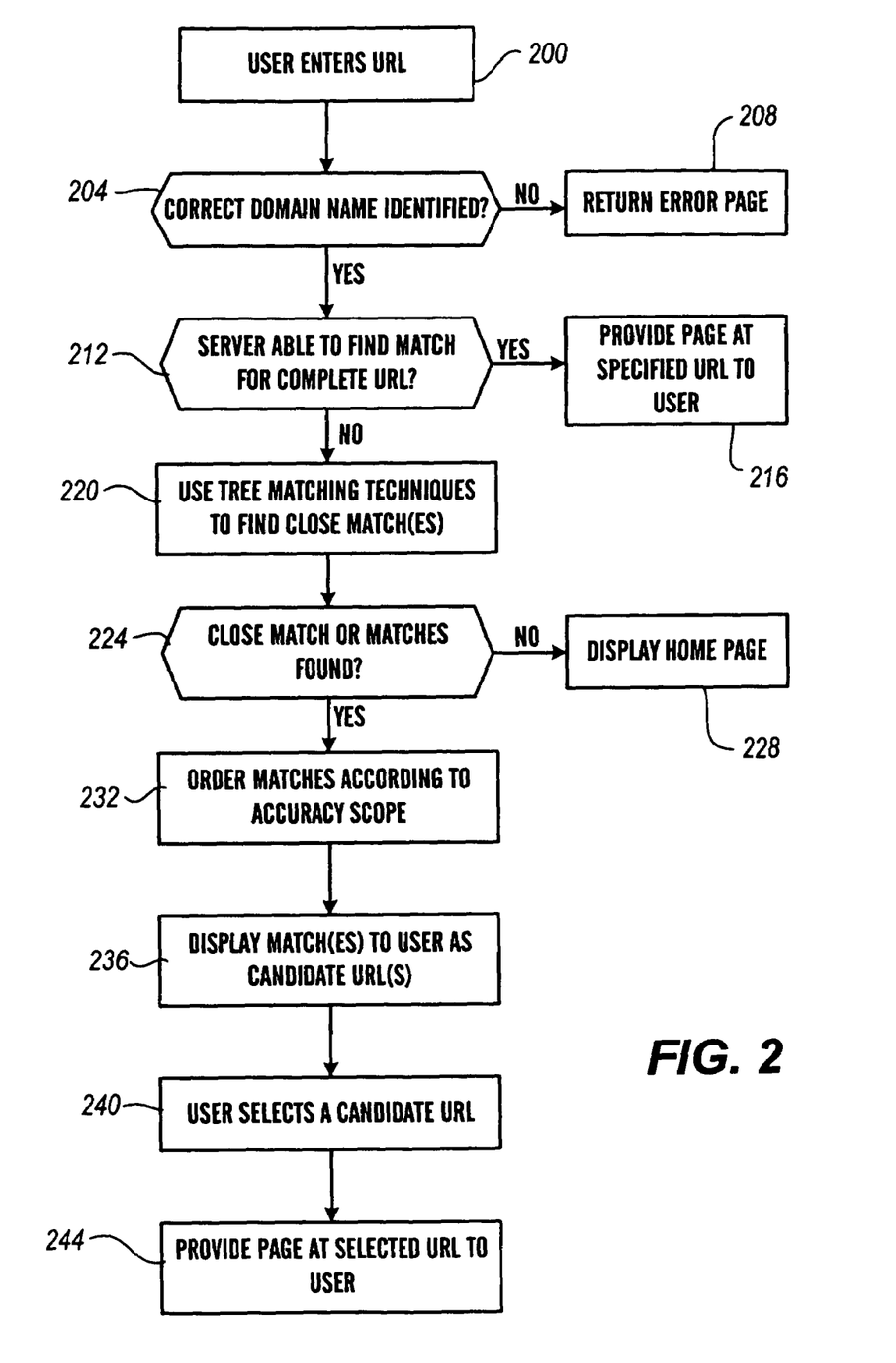
FIG. 2 is a flowchart depicting the operation of a system in accordance with an embodiment of the present invention for guessing an intended address.

With reference now to FIG. 2, a flowchart depicting the operation of an embodiment of the present invention is illustrated. Initially, at step 200, the user enters an address structure, for example, an address comprising a universal resource locator. At step 204, a determination is made as to whether an existing domain name has been identified within the entered URL. If a nonexistent domain name has been specified by the URL, an error page is returned to the user (step 208).

If an existing domain name has been entered, the client computer 104 is directed to the server 108 associated with the domain name. A determination is then made as to whether the server 108 is able to find a match for the complete URL entered by the user (step 212). If such a match is found, a requested page of information is provided to the user by the server 108 through the client computer 104 (step 216).

If an exact match for the complete URL cannot be found, tree matching techniques are used to find close matches (step 220). In particular, and as will be explained in greater detail below, the URL entered by the user is considered as a vine consisting of a number of elements, such as the domain name, and the path element or elements comprising the portion of the URL under the domain name. Similarly, the path structure of the domain (i.e. the arrangement of paths and subpaths within the domain) is considered as a tree consisting of a number of interconnected elements denoted by path and subpath elements. Next, a determination is made as to whether a close match or matches have been found by the tree matching techniques (step 224). If no close match or matches are found, the home page (i.e., the page at the domain name, without a specified path or subpath) is displayed (step 228).

If a close match or matches are found, the matches are ordered according to an accuracy score (step 232). The match or matches are then displayed to the user as candidate URLs (step 236). At step 240, the user selects one of the candidate URLs, and the user is then provided with the page associated with the selected URL (step 244).

Figure 3:
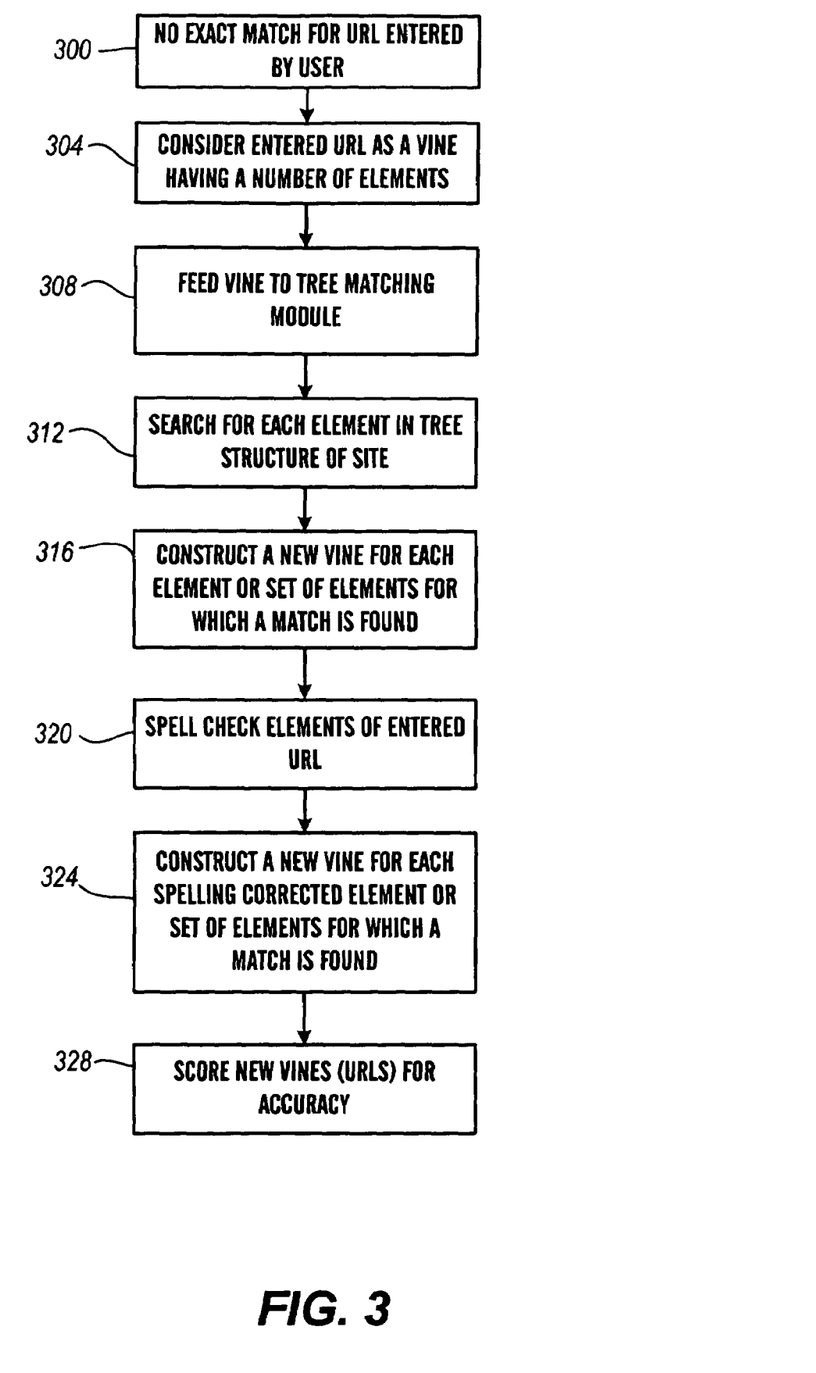
FIG. 3 is a flowchart depicting the matching functions performed by a system in accordance with an embodiment of the present invention for guessing an intended address.

With reference now to FIG. 3, the matching of an entered URL to one or more paths or subpaths included within a domain in accordance with an embodiment of the present invention is illustrated. Initially, at step 300, a URL having a correct domain name but having no exact match among the domain path elements (i.e. the paths or paths and subpaths included under the domain) is received at the server 108. The entered URL is then considered as a vine having a number of elements (step 304). For example, in connection with an Internet address, each term separated by a slash is considered as an independent address element. At step 308, the vine obtained from the entered URL is provided to a tree matching module running on the processor 140 of the server 108. In particular, the tree matching module may comprise a software module stored in data storage 144 and operable on the processor 140 in connection with software for providing requested web pages in response to queries from client computers 104.

Within the tree matching module, a search is made for each path element comprising the vine within the tree structure of the domain or site (step 312). A new vine is then constructed for each element or set of elements for which a match is found within the tree structure of the site (step 316). For example, if an entered URL includes a domain and a path consisting of one element, and the site includes the entered element as a subpath to a path, a new vine consisting of the domain name and the element specifying the subpath related to the domain name by the missing path element is constructed.

At step 320, an optional step of spell checking the elements of the entered URL is performed. A new vine is then constructed in connection with any spelling corrected element or set of elements for which a match is found within the tree structure of the site (step 324).

The new vines that have been created by comparing the entered URL to the tree structure of the site are then scored for accuracy (step 328). For example, vines having a structure closely related to the structure of the entered URL may be assigned a high score for accuracy. Alternatively, vines having structures that are dissimilar from the entered URL may be assigned a low score for accuracy. However, it may be desirable to return even those vines having low scores for accuracy to the user, as the transposition of elements in a URL as compared to their relationship within the tree structure of the site may result in a relatively low score, even though the vine created represents the desired page.

Figure 4:
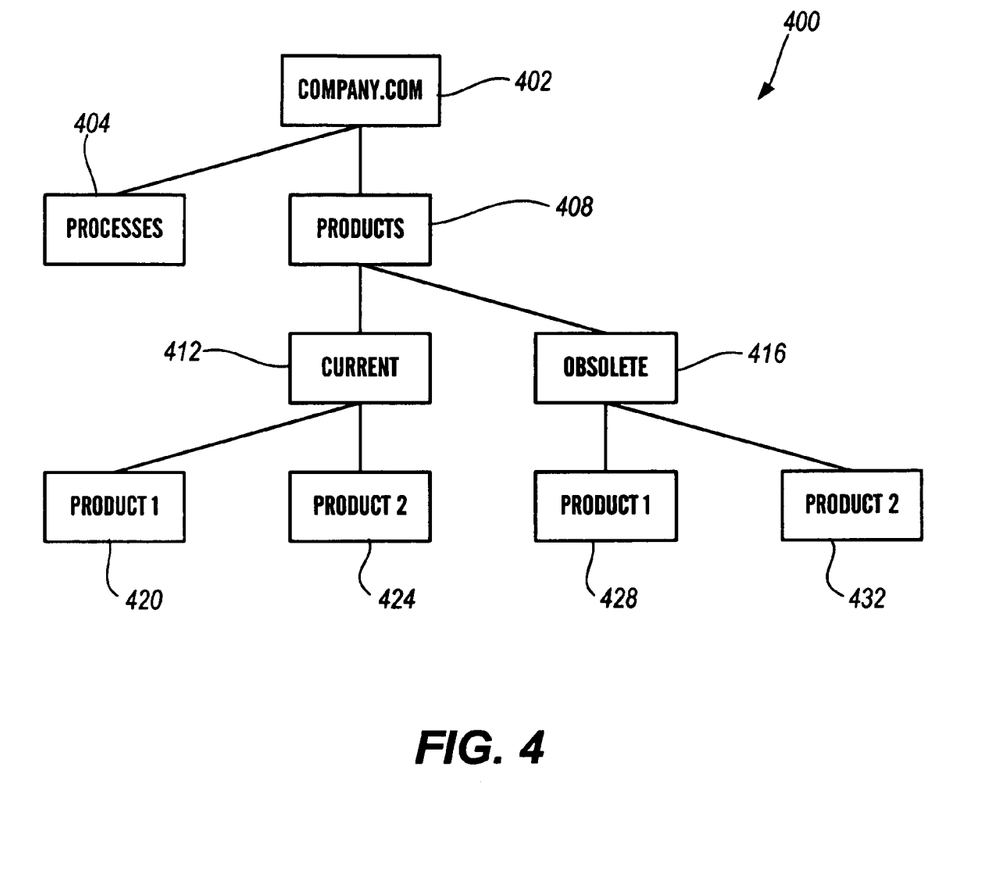
FIG. 4 illustrates an example path and subpath structure within a domain.

With reference now to FIG. 4, an example domain tree structure 400 is illustrated. In FIG. 4, the domain name is shown as "company.com" 402. Domain path elements under the domain "company.com" 402 include "processes" 404 and "products" 408. No domain path element comprising subpaths are shown below the path "processes" 404. However, the subpaths denoted by the path elements "current" 412 and "obsolete" 416 are shown under the path "products" 408. Additional subpaths are also shown in FIG. 4. For example, under the subpath "current" 412, there is a subpath "product 1" 420, and an additional subpath "product 2" 424. Similarly, under the subpath "obsolete" 416, there is a subpath "product 1" 428 and a subpath "product 2" 432. In the example of FIG. 4, each path and subpath may represent a different web page.

Figure 5A:
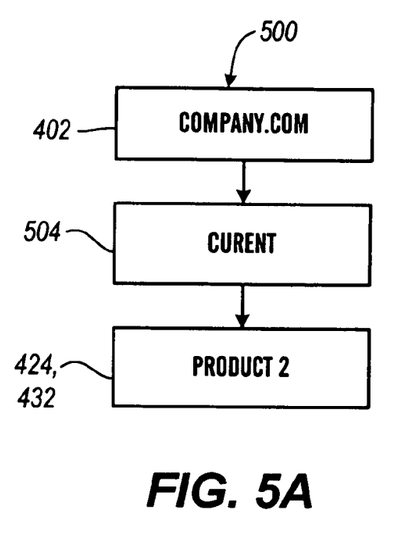
FIG. 5A illustrates the elements of an example address entered by a user.

With reference now to FIG. 5A, an example URL 500 entered by a user as "company.com/curent/Product2" at a client computer 104 is illustrated as a vine. Accordingly, the example URL 500 contains the domain name "company.com" 402, a path element "curent" 504 and a subpath element "product 2" 424, 432. The pattern matching module running on the processor 140 of the server 108 analyzes the structure of the URL 500 and compares it to similar structures within the tree 400 of the domain name. In the present example, the pattern matching algorithm also comprises a spell checking function that will operate to change the path element curent 508 to an element "current".

Figure 5B:
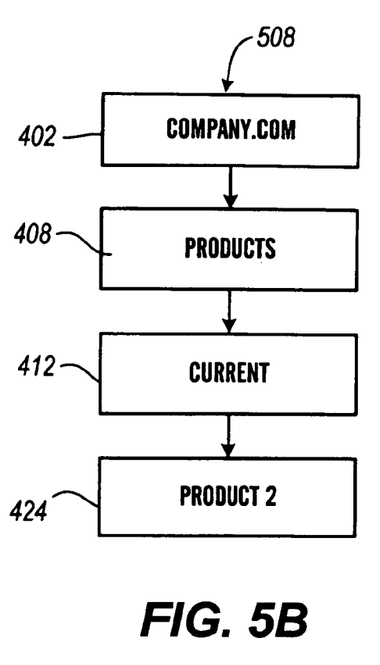
FIG. 5B illustrates the structure of a possible match returned by an embodiment of the present invention in response to receipt of the address shown in the example of FIG. 5A.

In FIG. 5B, an example of a suggested URL 508 constructed in response to receipt of the example entered URL 500 in accordance with an embodiment of the present invention is shown. In particular, the suggested URL 508 is shown as a vine determined by the tree matching module to be a likely match for the address containing the information that the user desires to access. In particular, the suggested URL 508 contains the domain name "company.com" 402, followed by the domain path element "products" 408. Next, the suggested URL 508 includes the domain element comprising the domain subpath element "current" 412. As can be appreciated, the tree matching module of the present invention has substituted the subpath element "current" 412 for the subpath element "curent" 504 entered by the user. This substitution is a result of the spell checking function. The corrected spelling "current" may be determined by reference to a general spell checking dictionary. The corrected spelling may also be determined by checking the elements entered by the user against a spell check dictionary that includes the domain elements used to describe paths and subpaths actually existing under the domain. Next, the suggested URL 508 appends the subpath "product 2" 424 beneath the subpath element "current" 412. The suggested URL 508 may be presented to the user in the form "company.com/products/current/product2". The user may then access the page at that address by selecting the displayed character structure (i.e. the address).

Figure 6A:
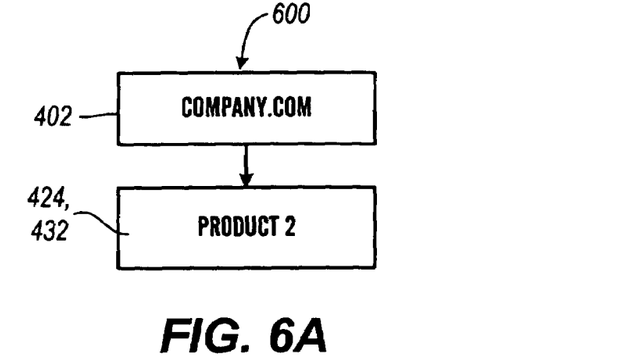
FIG. 6A illustrates the elements of another example address entered by a user.

With reference now to FIG. 6A, another example URL 600 illustrating an address structure entered by a user is shown as a vine. In particular, the example URL 600 entered by the user consists of the domain name "company.com" 402 followed by the path element "product 2" 424, 432. As can be appreciated, this example URL may be entered by the user as the string "company.com/product2." With reference again to FIG. 4, it can be appreciated that, under the domain "company.com" 402, there is no domain path element "product2". However, there are two subpaths named "product 2". In particular, there is a subpath "product 2" 424 under the subpath "current" 412, and a second subpath "product 2" 432 under the subpath "obsolete" 416. Possible matches returned by the tree matching module of the present invention in response to receipt of the URL 600 in the present example are shown in FIGS. 6B and 6C.

Figure 6B:
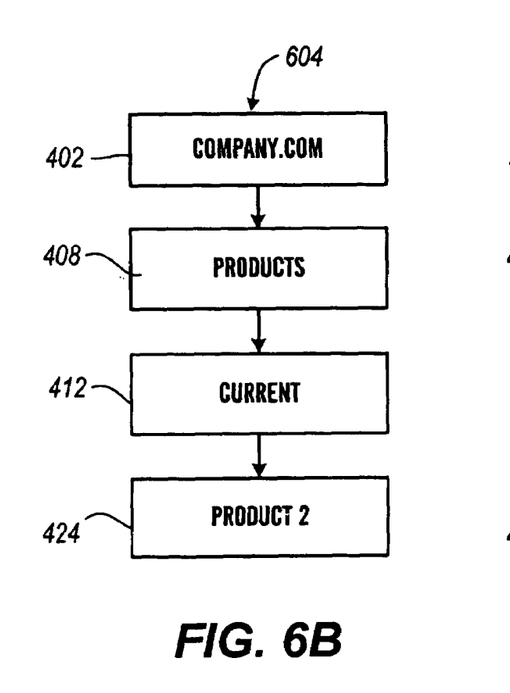
FIG. 6B illustrates the structure of a possible match returned by an embodiment of the present invention in response to receipt of the address shown in the example of FIG. 6A.
Figure 6C:
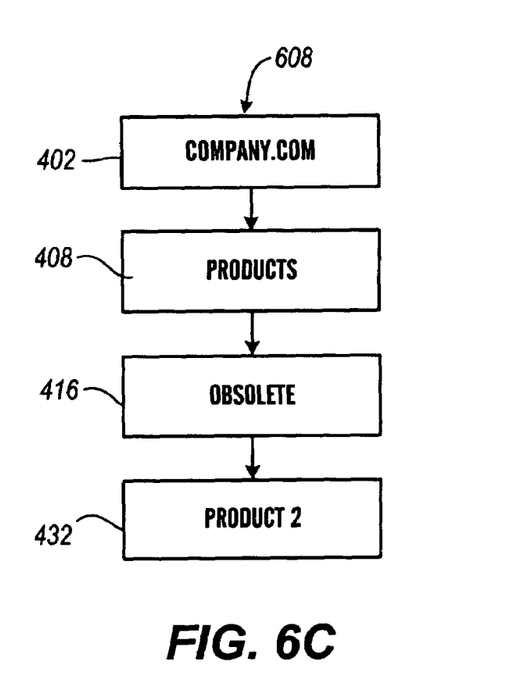
FIG. 6C illustrates the structure of another possible match returned by an embodiment of the present invention in response to receipt of the address shown in the example of FIG. 6A.

In FIG. 6B, the suggested URL 604 returned by the tree matching module consists of the domain name "company.com" 402, the path element "products" 408, the subpath element "current" 412, and finally the subpath element "product 2" 424. In FIG. 6C, a second suggested URL 608 is provided. The URL 608 consists of the domain name "company.com" 402, the path element "products" 408, the subpath element "obsolete" 416, and finally the subpath element "product 2" 432. The URL 608 may be presented to the user as an address structure in the form "company.com/products/obsolete/product2".

The address structure entered by the user, "company.com/product2" in the present example, is ambiguous as to whether the product 2 page existing under the subpath "current" 412 or the product 2 page existing under the subpath "obsolete" 416 is more likely the one intended by the user. However, the tree matching module may use differences in the vines comprising the suggested URLs 604, 608 returned to the user to assign accuracy scores to them. For instance, in the present example, the first suggested URL 604 may be assigned a higher score than the second suggested URL 608, because it can usually be assumed that a user would prefer information concerning a current product as compared to an obsolete product. However, it is often desirable to provide the user with a choice from among all possible vines existing within the tree structure of a domain. For instance, the user may own an obsolete version of product 2 for which the user desires information.

As can be appreciated, additional criteria for assigning scores to suggested URLs may be applied. For example, a suggested URL including a frequently accessed path or subpath may be assigned a higher score than a URL that is less frequently, accessed. As another example, a suggested URL having relatively few address elements may be given a higher score than a suggested URL having a relatively large number of address elements.

In order to provide greater flexibility, and to ensure that automatic features do not obscure an intended address, the present invention may also provide potential matches formed using vines that do not include address elements that have been explicitly replaced by spell checked versions of those elements. Therefore, in response to receiving the example URL 500 in FIG. 5A, rather than being presented with only the URL illustrated in FIG. 5B, the example URL shown in FIG. 6C may also be returned to the user.

Although the examples set forth above generally describe the use of address structures in connection with locating pages maintained by a web server, it should be appreciated that the present invention is not so limited. For example, the present invention may be applied toward locating session initiation protocol addresses.

The present invention also has application to locating directories and/or files within a computer system. In such an application, the domain name may comprise an identification of a storage device, and path elements may identify a directory or directories and a desired file.

The foregoing discussion of the invention has been presented for purposes of illustration and description. Further, the description is not intended to limit the invention to the forms disclosed herein. Consequently, variations and modifications commensurate with the above teachings, within the skill and knowledge of the relevant art, are within the scope of the present invention. The embodiments described hereinabove are further intended to explain the best mode presently known of practicing the invention and to enable others skilled in the art to utilize the invention in such or in other embodiments and with various modifications required by their particular application or use of the invention. It is intended that the appended claims be construed to include the alternative embodiments to the extent permitted by the prior art.

What is claimed is:

1. A method for locating an intended universal resource locator, comprising:
   receiving an address structure, comprising:
     a domain name, wherein said domain name correctly identifies the domain containing a desired page;
     at least a first path element, wherein said received address structure does not correspond to a path existing under said domain name;
   comparing said received address structure to a structure of paths existing under said domain name;

returning as a possible match at least a first suggested address structure comprising said domain name and a first path existing under said domain name; and returning as a possible match at least a second suggested address structure comprising said domain name and a second path existing under said domain name, wherein the position of the first path element in the first path is different than the position of the first path element in the second path.

2. The method of claim 1, wherein said intended universal resource locator comprises a web page address.

3. The method of claim 1, wherein said step of comparing comprises:

separating said address structure into address elements;

detecting a match between a first address element and a domain name path element.

4. The method of claim 3, wherein said step of comparing further comprises detecting a match between a structure of said address elements and a structure of domain name path elements.

5. The method of claim 3, wherein said step of comparing further comprises spell checking said address elements.

6. The method of claim 5, wherein said step of spell checking comprises consulting a spell check dictionary comprising domain path elements.

7. The method of claim 1, further comprising:

ranking said returned possible matches for accuracy.

8. A computer readable medium for storing software capable of performing the steps of claim 1.

9. A logic circuit for performing the steps of claim 1.

10. A system for returning a requested web page, comprising:

a server computer associated with a domain, comprising:

a communication network interface;

a data storage device for storing software;

a processor capable of running said software, wherein said domain comprises a domain path, and wherein said server computer is operable to provide at least one of information and an interconnection to a communication device at an address specified by an address structure corresponding to a domain path element described by said address structure and available under said domain to said communication network interface;

first programing running on said processor, wherein in response to receiving an entered path comprising a domain name and a first path element that does not correspond to an actual path under said domain name, said entered path is compared to actual paths under said domain name, wherein a first suggested path comprising said first path element in a first position in said first suggested path is returned to a requesting device, wherein a second suggested path comprising said first path element in a second position in said second suggested path is returned to the requesting device, and wherein at least a hierarchical position of said first path element in said first suggested path is different than a hierarchical position of said first path element in said second suggested path.

11. The system of claim 10, wherein said server provides a page of information to said communication network interface in response to receiving an address string corresponding to a domain path element available under said domain.

12. The system of claim 10, further comprising:

a communication network; and a client computer interconnected to said communication network and operable to receive an address structure from a user, wherein said software running on said server provides a suggested address structure to said client computer in response to receiving an address structure that does not accurately describe said domain path within said associated domain.

13. The system of claim 12, wherein said server interconnects said client computer to a communication device in response to receiving an address string corresponding to a least one of a path and a subpath available under said domain.

14. The system of claim 12, wherein said client computer comprises an initiating communication device.

15. The system of claim 10, wherein said server comprises a communication server.

16. The system of claim 10, wherein said server comprises a web server.

17. A system for completing a desired interconnection in response to a received address that does not exist, comprising:

means for hosting at least one of information pages and communication devices, wherein said at least one of information pages and said communication devices are organized in a tree structure;

means for providing an address structure to said means for hosting; and means for comparing said free structure to said address structure, wherein a possible match between a plurality of paths within said tree structure and said address structure is determined, wherein at least two of said plurality of paths include a first path element also included in the provided address structure, and wherein a position of the first path element in a first one of the at least two paths is different than the position of the first path element in a second one of the at least two paths.

18. The system of claim 17, further comprising:

means for displaying said possible match to a user; and means for receiving a user selection of a one of said possible matches.

19. The system of claim 17, further comprising:

means for assigning an accuracy score to each of a plurality of possible matches.

20. The system of claim 17, wherein said means for hosting comprises a communication server.

21. The system of claim 17, wherein said means for hosting comprises a web server.

22. A method for finding a requested address, comprising:

receiving an address structure comprising:

a domain name, wherein said domain name identifies an existing domain, and wherein said domain name correctly identifies the domain containing a desired page;

a first path element, wherein said of received address structure does not exactly match a path existing under said domain;

matching said received address structure to at least a first path existing under said domain;

returning as a possible match at least a first suggested address structure comprising said domain name and a first path existing under said domain name; and returning as a possible match at least a second suggested address structure comprising said domain name and a second path existing under said domain name, wherein the position of the first path element in the first path is different than the position of the first path element in the second path.

23. The method of claim 22, wherein said step of matching comprises:

considering a structure of domain path elements existing under said domain as a tree structure;

considering said received address structure as a vine;

matching said vine to elements within said tree structure to obtain a suggested address structure.

24. The method of claim 22, further comprising:

serving information at a location identified by said at least a first path.

25. The method of claim 22, further comprising matching said address structure to a plurality of paths existing under said domain, said method further comprising:

assigning a score to each of said paths indicating an expected likelihood that a particular path corresponds to a path intended by said received address structure.

\* \* \* \* \*